United States Patent [19]
Heurtebise

[11] 3,731,019
[45] May 1, 1973

[54] OMNI-DIRECTIONAL FORCE SENSOR

[76] Inventor: Byron T. Heurtebise, 2942 Lone Tree Road, Milford, Mich. 48042

[22] Filed: July 23, 1971

[21] Appl. No.: 172,338

[52] U.S. Cl. ............................................ 200/61.45 R
[51] Int. Cl. .................................................. H01h 35/14
[58] Field of Search ..200/61.45–61.53; 340/261, 262

[56] References Cited

UNITED STATES PATENTS 3,619,524  11/1971  Gillund ........................ 200/61.45 M
2,881,276  4/1959   Mintz et al. .................. 200/61.45 R
3,335,239  8/1967   Fey ................................ 340/261 X
3,531,605  9/1970   Schrichte ..................... 200/61.45

*Primary Examiner*—Herman J. Hohauser
*Assistant Examiner*—M. Ginsburg
*Attorney*—David A. Maxon

[57] ABSTRACT

This application relates to a sensor. It is responsive to impact of predetermined magnitude from any direction. It can be mounted in a car for actuation responsive to impact of safety apparatus within an automobile.

3 Claims, 5 Drawing Figures

Patented May 1, 1973 3,731,019

INVENTOR
BYRON T. HEURTEBISE

3,731,019

OMNI-DIRECTIONAL FORCE SENSOR

This application relates to impact responsive apparatus in motor vehicles. More specifically, this invention relates to such apparatus responsive to impact above a predetermined level of magnitude in any direction.

In the art of designing apparatus for improving safety features of automobiles, a number of devices have been designed responsive to substantial impacts of a limited number of directions. The more sophisticated of these designs have been confined to forward or aft impacts but not sideways impacts.

Unfortunately, a number of accidents with motor vehicles occur in which the impact on an automobile is from a direction other than fore or aft. Such accidents often result in substantial property damage and personal injuries. There have been no adequate safety systems designed to reduce property damage and injury due to impact sensed in a direction other than fore and aft.

It is therefore an object of this invention to provide safety apparatus of a motor vehicle actuated by apparatus responsive to impact imposed on the automobile from a direction other than fore and aft.

It is a further object of this invention to provide a device for sensing impact on an automobile from any direction that is uncomplicated, inexpensive to manufacture and maintain, and is efficient and substantially maintenance free in operation.

These and other objects are achieved by a sensing device comprising inner and outer hollow spheres; nodules made of electrically conductive material on the outer surface of the inner sphere; the inner surface of the outer sphere made of electrically conductive material; means resiliently supporting the inner sphere within the outer sphere; said nodules touching said outer sphere responsive to an impact above a predetermined magnitude being imposed on the vehicle in which the sensor is installed.

These and other objects will be understood from the following description and specification of embodiments of this invention.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

Figure 1:
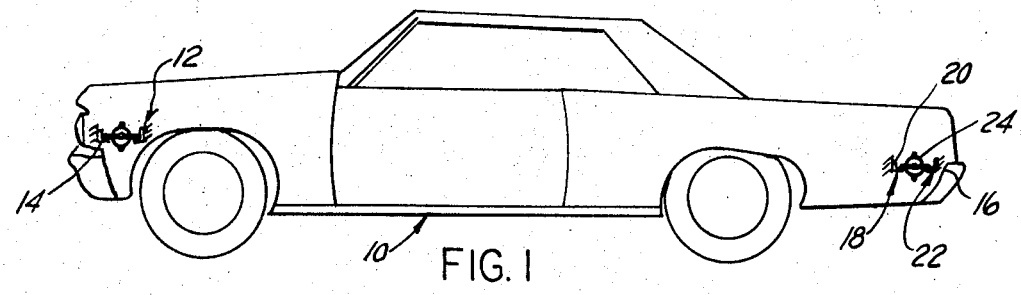
FIG. 1 is a side view partially broken away showing an automobile with a preferred embodiment of this invention.
Figure 2:
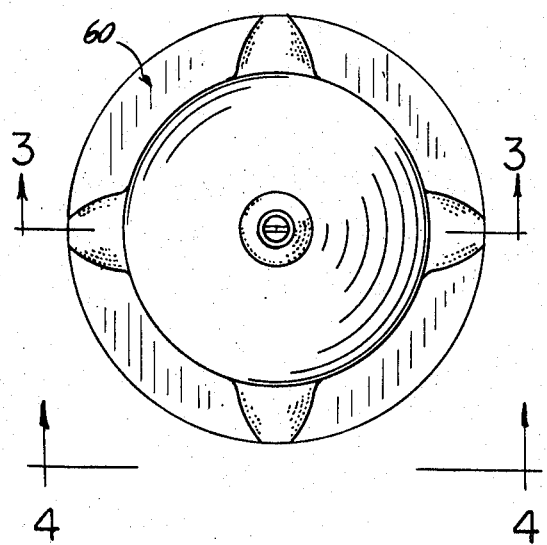
FIG. 2 is a side view of a preferred embodiment of apparatus utilizing the principles of this invention.

AS SHOWN ON THE DRAWINGS:

In FIG. 1 an automobile 10 is shown. Assemblies 12 of the preferred embodiment of this invention are mounted in a fore position 14 and aft position 16 of the automobile.

Each assembly comprises mounting brackets 18 having a vertical arm 20 thereof rigidly fixed to the frame of the automobile. A horizontal ledge 22 is rigidly fixed to a housing 24 containing the sensing apparatus of the preferred embodiment of the invention.

A hollow sphere like member 26 serves as a sensor, sensing, or switch closing member. This sensing member is a substantially sphere-like in general configuration and is preferably made of a metal that readily conducts electricity.

Nodules 28 project radially outwardly from the outer surface of this sphere and are substantially uniformally arrayed around the entire outer surface of the sphere at substantially uniform distances from one another throughout most of the array. Each of the nodules 28 has a circular face 30 at the outer extremity thereof constituting the top surface of a truncated upstanding right circular conical embossment 32.

The outer shell portion 24 is also substantially spherical in shape having a larger diameter than the inner sphere 26.

Nodules 34 extend radially outwardly from and integral with the outer shell 24. These nodules 34 are diametrically opposed and spaced at arc intervals of 90° from one another. These nodules are hollow and contain interior chambers 36 therein.

Bolts 38 are inserted through the top portions 40 of the outer nodules 34 into the chamber portions 36. The stem portion 42 of the bolts 38 extend for some distance within the interior chambers 36 but not so far as to come into contact with the outer surface of the sphere 26.

A washer 44 is concentric with a stem 42. The washer 44 is made of a material that is dielectric, that is to say, substantially non-conductive to the passage of electrical current.

Coil springs 46 are concentric with and radially outwardly from and disposed in contact with the washers 44. The washers 44 have a shank portion 47 that separate the coils of spring 46 from contact with the bolt stem 42. The washer 44 also prevents contact of the coil spring 46 with the inner surface of the outer sphere 24. The coil springs come into contact with the outer surface of the sphere 26 and cooperate with one another to yieldably engage the sphere 26.

The inner surface 48 of the outer sphere member 24 is made of a metal that is conductive to electricity.

Figure 5:
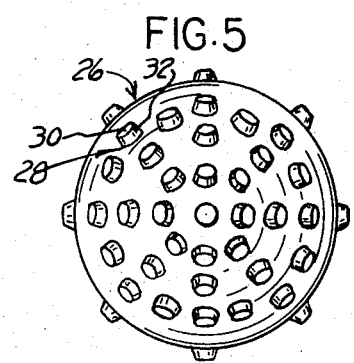
FIG. 5 is a front view of the floating member used in the preferred embodiment of this invention.

The outer spherical member also comprises a horizontal ledge portion 60 that can be readily attached to bracket member 18. It can also be appreciated from FIG. 5 that the outer spherical member can be readily manufactured in the form of two substantially hemispherical portions where each portion is identical in shape and mate along corresponding ledge portions 62 and 65 to form ledge portion 60. The two portions can be simply bolted together. They can provide a means of readily assemblage and disassemblage for purposes of adjusting the portion of the sensor element 26 and possibly a spring or other component for maintaining a predetermined precise normal position of the sensor.

In its normal position, the sphere 26 is maintained by the springs 46 with respect to the inner surface 48 of the outer spherical member 24 such that none of the nodules are in contact with the surface 48 and all of the nodules are maintained at a distance, that is substantially uniform, from the surface 48. The coil springs are chosen for spring constant in such a manner as to be substantially matched to maintain this uniform separation. These spring constants are also chosen in correlation with the weight of the inner sphere 26 such that when there is a change of momentum of the inner sphere with respect to the outer sphere, beyond a predetermined threshhold, the resultant acceleration or deceleration and resultant forces on the sphere causes at least one of the coil springs to compress and at least one of the other springs to extend so as to allow motion of the inner sphere 26 to displace from its normal position such that one or more of the nodules 30 come into contact with surface 48 of the outer sphere member 24.

Figure 3:
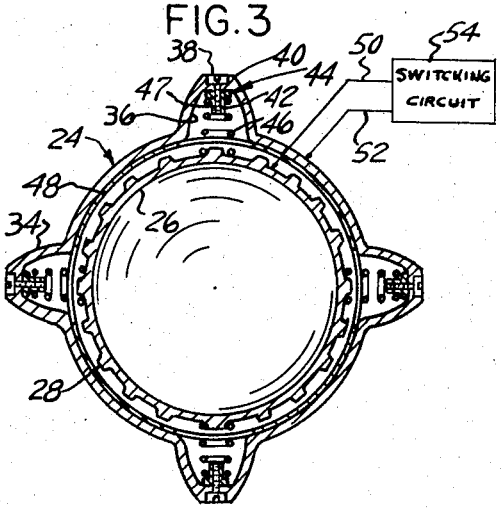
FIG. 3 is a transverse sectional view of the apparatus shown in FIG. 2 along the lines 3—3 thereof.
Figure 4:
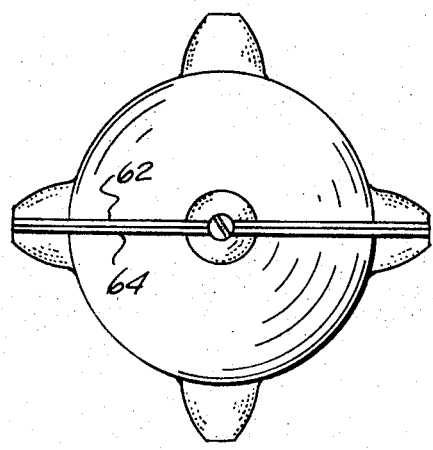
FIG. 4 is a bottom view viewed from the section lines 4—4 of the apparatus shown in FIG. 2.

Electrical potential is conducted to the inner sphere 26 by means of a flexible wire that is insulated from electrical conduction from the outer sphere 24. Means operable to conduct electricity to or from the outer sphere 24 that is insulated from electrical conduct with inner sphere 26 is also provided. This is shown in diagramatical form in FIG. 3.

The electrical conduits 50 to the inner sphere 26 and electrical conduit 52 to the outer sphere 24 are on positive and negative sides respectively of electrical circuit apparatus 54.

When the nodules 30 of inner sphere 26 come into contact with inner surface 48 of outer sphere member 24 a previously open circuit is now closed providing electric current through conduits 50 and 52 in a common circuit.

Means responsive to such a flow of electric current such as a gate circuit or a bi-stable multivibrator is provided in electrical circuit means 54 for energizing of an air bag or other appropriate safety device where it is desired to have such energization in response to a predetermined threshhold of acceleration or deceleration of the automobile.

From the foregoing description it can be appreciated that the aforementioned desired energization is in response to a predetermined threshhold of magnitude of acceleration or deaceleration regardless of the direction of the acceleration or deaceleration. In other words, the the apparatus is responsive to directions of forces that are not confined to merely a fore and aft direction.

I claim:

1. In apparatus for sensing rapid change of inertia on an automobile within predetermined threshhold limits, the improvements comprising:
    an outer substantially spherical shell member;
    an inner substantially spherical switch closing member;
    yieldably mechanical and non-magnetically responsive biasing means operating to maintain a predetermined normal position of the switch closing member with respect to the outer shell member when mechanical forces on said biasing means are less than a predetermined non-zero threshhold;
    said biasing means being operable without exerting magnetic forces on said switch closing member;
    means insulating the switch closing member from electrical contact with said outer member responsive to operation of said biasing means;
    said switch closing member being substantially spherically shaped with radially outward projecting nodules embossed thereon and uniformly spaced apart throughout the surface of said switch closing member;
    a substantially spherical inner surface of said outer shell member and said nodules being electrically conductive;
    a substantial portion of the inner switch closing member being electrically conductive;
    any one of said nodules of said inner switch closing member coming into electrical contact with said inner surface of said outer shell member responsive to forces from any direction overcoming said biasing means above said predetermined threshhold rendering said biasing means inoperable to maintain the normal position of said switch closing member the length of path between each of said nodules and said inner surface of said outer shell member that said each nodule must travel from said predetermined normal 10/30/sh position to said electrical contact being substantially the same order of magnitude as the length of path between the nodule displaced 180° away from said each nodule and said inner surface of said outer shell member that said displaced nodule must travel from said predetermined normal position to said electrical contact.

2. The apparatus of claim 1 wherein said nodules are in the shape of truncated right circular upstanding conical embossments and are spaced apart at a distance no greater than one-eighth (⅛) of the circumference of said switch closing member.

3. The apparatus of claim 1 wherein said outer shell member has a substantially spherical shape with radially outwardly extending nodules that are hollow forming chambers therein;
    bolts extending radially inwardly in the centers of said chambers;
    said bolts having concentric dielectric washer means surrounding the stem portions thereof;
    said biasing means being in the form of coil springs concentric with and surrounding a portion of said washer means;
    said washer means and said bolts cooperating to insulate said springs from electrical contact with said outer shell member and also limiting the motion of said coil springs to translational expansion and contraction substantially parallel to the concentric axes of said coil springs, said bolt and said washer means.

* * * * *